(12) United States Patent
Logiudice

(10) Patent No.: US 8,773,038 B2
(45) Date of Patent: Jul. 8, 2014

(54) DRIVER CIRCUIT FOR EFFICIENTLY DRIVING A LARGE NUMBER OF LEDS

(75) Inventor: Andrea Logiudice, Padua (IT)

(73) Assignee: Infineon Technologies AG, Neubiberg (DE)

( * ) Notice: Subject to any disclaimer, the term of this patent is extended or adjusted under 35 U.S.C. 154(b) by 228 days.

(21) Appl. No.: 13/219,161

(22) Filed: Aug. 26, 2011

(65) Prior Publication Data

US 2013/0049599 A1    Feb. 28, 2013

(51) Int. Cl.
*H05B 37/02* (2006.01)
(52) U.S. Cl.
USPC .......................... 315/291; 315/307
(58) Field of Classification Search
USPC ...... 315/209 R, 224–226, 291, 307, 308, 312
See application file for complete search history.

(56) References Cited

U.S. PATENT DOCUMENTS

| 2005/0243022 | A1* | 11/2005 | Negru | 345/46 |
| 2007/0257623 | A1* | 11/2007 | Johnson et al. | 315/193 |
| 2010/0264828 | A1 | 10/2010 | Cortigiani et al. | |
| 2011/0210674 | A1* | 9/2011 | Melanson | 315/185 R |

* cited by examiner

*Primary Examiner* — Jimmy Vu
(74) *Attorney, Agent, or Firm* — Slater & Matsil, L.L.P.

(57) ABSTRACT

A circuit can be used for controlling a plurality of LEDs coupled in series. A switching converter operates as a current source coupled to the plurality of LEDs to provide a constant load current thereto. The switching converter includes an inductor coupled in series with the plurality of LEDs such that the same load current flows through the inductor and the plurality of LEDs. No substantial capacitance is coupled between the inductor and the plurality of LEDs. A floating driver circuit is coupled in parallel with each individual LED of the plurality of LEDs. The floating driver circuit is configured to fully or partially take over the load current thereby bypassing the respective LED in accordance with a respective modulated input signal to control the intensity of the light emitted by the LED.

24 Claims, 7 Drawing Sheets

DRIVER CIRCUIT FOR EFFICIENTLY DRIVING A LARGE NUMBER OF LEDS

TECHNICAL FIELD

The invention relates to the field of driver circuits for light emitting diodes (LEDs), especially for a large number of LEDs which are employed, e.g., in flat panel display devices.

BACKGROUND

Light emitting diodes (LEDs) are increasingly utilized for illumination and display applications since high power LEDs are available at low costs. In order to provide a constant light intensity light emitting diodes have to be driven with a constant load current.

For driving a single LED or a plurality of LEDs with a constant current special driver circuits have been developed. When driving a very large number of LEDs, such as LED matrices employed in LED display devices efficiency becomes a major issue as well as a precise load current setting in order to ensure a homogeneous emission of light throughout the matrix. Connecting several LEDs in series may reduce the power dissipation in the driver circuits. However, the brightness of the LEDs cannot be individually controlled which is particularly desirable when using LEDs of different colors for additive mixing of colors.

The use of switched mode power supplies for driving a number of LEDs is known per se. However, known approaches may not enable a brightness control for each individual LED, undesired current mismatch between LEDs may occur due to tolerances, and often a number of bulky inductors may be required.

There is a need for a novel low power loss LED driver circuit that enables the individual brightness control of the connected LEDs. Further, a fault detection may be desirable to identify and, optionally, bypass defective LEDs.

SUMMARY OF THE INVENTION

A circuit for controlling a plurality of LEDs coupled in series (LED chain) is disclosed. In accordance with one example of the present invention the circuit includes a switching converter operable as a current source coupled to the plurality of LEDs to provide a constant load current thereto. The switching converter includes an inductor coupled in series to the plurality of LEDs such that the same load current flows through the inductor and the plurality of LEDs. No capacitor is coupled between the inductor and the plurality of LEDs. A floating driver circuit is coupled in parallel to each individual LED of the plurality of LEDs. The floating driver circuit is configured to fully or partially take over the load current thereby bypassing the respective LED in accordance with a respective modulated input signal to control the intensity of the light emitted by the LED.

In accordance with another example of the invention, the circuit includes a current source coupled to the plurality of LEDs to provide a constant load current thereto. A floating driver circuit is coupled in parallel to each individual LED of the plurality of LEDs. The floating driver circuit is configured to fully or partially take over the load current thereby bypassing the respective LED in accordance with a respective modulated input signal to control the intensity of the light emitted by the LED. Each floating driver circuit includes a bypass transistor having a load current path being coupled in parallel to the corresponding LED and a diode having a defined breakdown voltage. The diode is coupled in parallel to the corresponding LED such that the diode takes over the load current when the voltage across the load current path of the bypass transistor reaches the breakdown voltage thus limiting the voltage across the load current path.

In accordance with a further example of the invention, a circuit can be used for controlling a plurality of LEDs coupled in series. The circuit includes a current source coupled to the plurality of LEDs to provide a constant load current thereto. A floating driver circuit is coupled in parallel to each individual LED of the plurality of LEDs. The floating driver circuit is configured to fully or partially take over the load current thereby bypassing the respective LED in accordance with a respective modulated input signal to control the intensity of the light emitted by the LED. The floating driver circuit includes a bypass transistor having a load current path coupled in parallel to the corresponding LED and a gate driver configured to drive the bypass transistor into an ON and an OFF state in accordance with the modulated input signal. A logic gate receives the modulated input signal and the over-voltage signal and configured to override the modulated signal in case the over-voltage signal is active so as to permanently switch on the bypass transistor.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
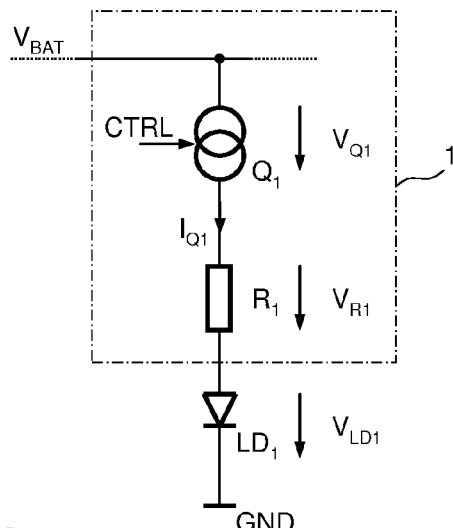
FIG. 1 illustrates a conventional LED driver circuit.

FIG. 1 illustrates a commonly used driver circuit 1 for driving a light emitting diode $LD_1$. The driver circuit 1 comprises a current source $Q_1$ and an optional series resistor $R_1$ both connected in series to the light emitting diode $LD_1$. In the present example, the current source $Q_1$ is supplied from a first supply potential $V_{BAT}$ that is provided, for example, by an automotive battery. The cathode of the light emitting diode $LD_1$ is connected to a reference supply terminal providing a reference supply potential, e.g., ground potential GND. However, the positions of the diode $LD_1$, the optional resistor $R_1$, and the current source $Q_1$ may be interchanged arbitrarily.

In order to adjust the brightness of the light emitting diode $LD_1$, the current source $Q_1$ may be controllable, that is, the load current $IQ_1$ passing through the current source $Q_1$ is dependent on a control signal CTRL received by the current source $Q_1$.

The power losses $P_D$ dissipated in the driver circuit may be calculated according to the following equation, provided that no resistor is present:

$$P_D = I_{Q1}(V_{BAT} - V_{LD1}),  \quad (1a)$$

If series resistor $R_1$ is used, the power losses are:

$$P_D = I_{Q1}(V_{BAT} - I_{Q1} \cdot R_1 - V_{LD1}),  \quad (1b)$$

Resistor $R_1$ is helpful in order to reduce the power losses the current source $Q_1$ has to handle. $R_1$ takes over a part of the overall power losses and therefore may help to avoid a "hot spot" in the current source $Q_1$.

$V_{LD1}$ denotes the forward voltage drop across the light emitting diode $LD_1$. Since battery voltages $V_{BAT}$ are typically much higher than the forward voltage $V_{LD1}$ of the light emitting diode, power losses in the driver circuit are rather high. This entails increased efforts for cooling of the driver circuit and, in automotive applications, increased petrol consumption.

When driving more than one LED and if the brightness of each LED should be controllable, then a separate driver circuit 1 according to FIG. 1 may be used for each single diode, thus the power loss $P_D$ as calculated according to the equation 1 multiplicates by the number of LEDs.

Figure 2:
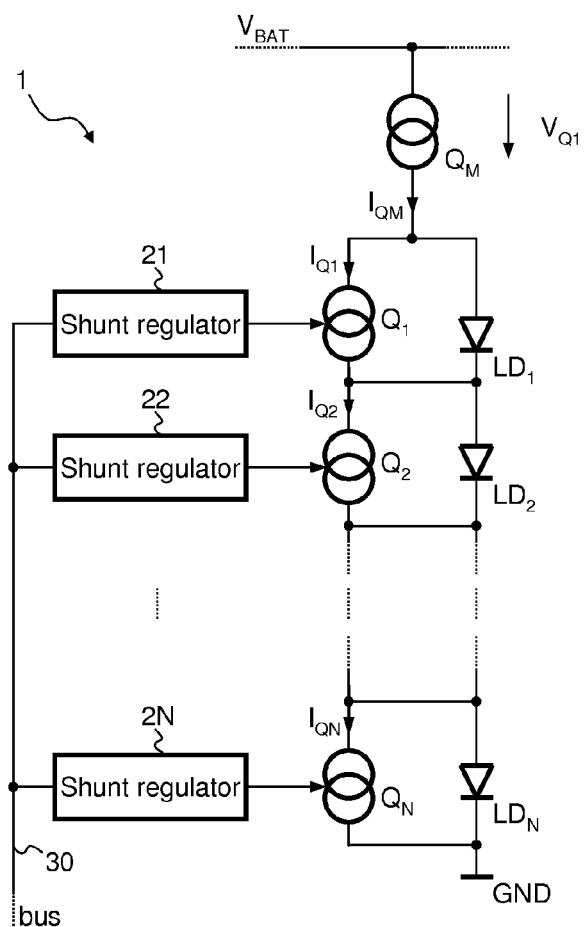
FIG. 2 illustrates a LED driver circuit suitable for driving a "LED chain" including a large number of LEDs.

FIG. 2 illustrates a novel driver circuit 1 for driving a plurality of arrays of light emitting diodes $LD_1, LD_2, \ldots LD_N$. However, the driver circuit 1 of FIG. 2 may be usefully employed for driving at least two arrays of light emitting diodes $LD_1, LD_2, \ldots, LD_N$ connected in series. The driver circuit comprises a main current source $Q_M$ providing a main current $I_{QM}$. A plurality of bypass current sources $Q_1, Q_2 \ldots, Q_N$ are connected in series to the main current source $Q_M$ and have terminals for connecting an array of light emitting diodes in parallel to each bypass current source $Q_1, Q_2 \ldots, Q_N$. Each bypass current source $Q_1, Q_2 \ldots, Q_N$ drives a bypass current $I_{Q1}, I_{Q2} \ldots, I_{QN}$.

In the circuit of FIG. 2 each of the arrays of light emitting diodes comprises one light emitting diode, only. However, instead of only one diode a serial circuit including several light emitting diodes in series, a parallel circuit including several light emitting diodes connected in parallel, or a parallel-serial circuit including several serial circuits with light emitting connected in parallel, may be connected in parallel to each of the bypass current sources $Q_1, Q_2 \ldots, Q_N$ as well.

The main current source $Q_M$ is supplied by a first supply potential $V_{BAT}$, that is, for example, provided by an automotive battery. When using a linear current regulator, the supply voltage $V_{BAT}$ fed to the driver circuit 2 should be selected to be high enough for supplying the number of diodes $LD_1, LD_2, \ldots LD_N$ that are connected in series. In the circuit of FIG. 2 each bypass current source $Q_1, Q_2 \ldots, Q_N$ and the respective light emitting diode $LD_1, LD_2, \ldots LD_N$ form a parallel circuit, wherein all these parallel circuits are connected in series between the main current source $Q_M$ and a supply terminal providing a reference supply potential, e.g. ground potential GND.

One regulator unit 21, 22, ... 2N is connected to each bypass current source $Q_1, Q_2 \ldots, Q_N$ and is configured to control the bypass current $I_{Q1}, I_{Q2} \ldots, I_{QN}$ passing through the respective bypass current source $Q_1, Q_2 \ldots, Q_N$. As a result, the effective load current $I_{LD1}$ that passes through a certain light emitting diode $LD_1$ of the plurality of light emitting diodes equals to the difference between the main current $I_{QM}$ and the respective bypass current $I_{Q1}$, that is:

$$I_{LDi} = I_{QM} - I_{Qi}, \quad (2)$$

whereby i is an index ranging from 1 to N denoting the number of the bypass current source $Q_i$ with the bypass current $I_{Qi}$ and the light emitting diode $LD_i$ with the load current $I_{LDi}$.

By means of the regulator units 21, 22, ..., 2N the brightness of each single LED $LD_i$ may be adjusted to a desired value by appropriately controlling the bypass currents $I_{Qi}$ and thus the load currents $I_{LDi}$. Each regulator unit 21, 22, ..., 2N may comprise a digitally addressable bus interface, for example, a serial bus interface for connecting a serial bus 30. The desired current or brightness value may be received from the bus 30 as a binary word. If desired brightness values are received from the bus 30, the regulator units 21, 22, ..., 2N may comprise a calibration table for converting a received desired brightness values to a desired load current value $I_{Di}$ for the respective light emitting diode $LD_i$.

After the desired load current value $I_{Di}$ has been found the bypass current $I_{Qi}$ of the respective bypass current source is set to drive a bypass current $I_{Qi} = I_M - I_{Di}$. However the bypass current sources $Q_i$ do not necessarily have to drive continuous bypass currents $I_{Qi}$. The regulator units 21, 22, ..., 2N are often easier to implement if the bypass current sources $Q_i$ are controlled by a pulsed control signal resulting in pulsed bypass currents $I_{Qi}$ and in pulsed load currents $I_{LDi}$ whose average value equals to the desired load current $I_{Di}$. For this purpose each regulator unit 21, 22, ..., 2N may comprise a modulator for providing a pulsed control signal, e.g., a pulse-width modulated, a pulse-frequency modulated, or a pulse-density modulated control signal for controlling the bypass current sources $Q_i$. In this case the bypass currents $I_{Qi}$ are switched on and off according to the pulsed control signal supplied to the bypass current sources $Q_i$ by the respective regulator unit.

Summarizing the above, bypass current sources Q may be controlled to either provide a varying current $I_{Qi}$ that ranges from zero to a given maximum value dependent on a respective control signal provided by the corresponding shunt regulator. The maximum value in this connection may correspond to the current provided by main current source $Q_M$, where in this case the current through an array is zero if the current provided by the corresponding bypass current source has its maximum value. Alternatively, bypass current sources $Q_i$ may be controlled in pulsed fashion. The bypass current $I_{Qi}$ is in this case either zero or a given maximum value.

Figure 4:
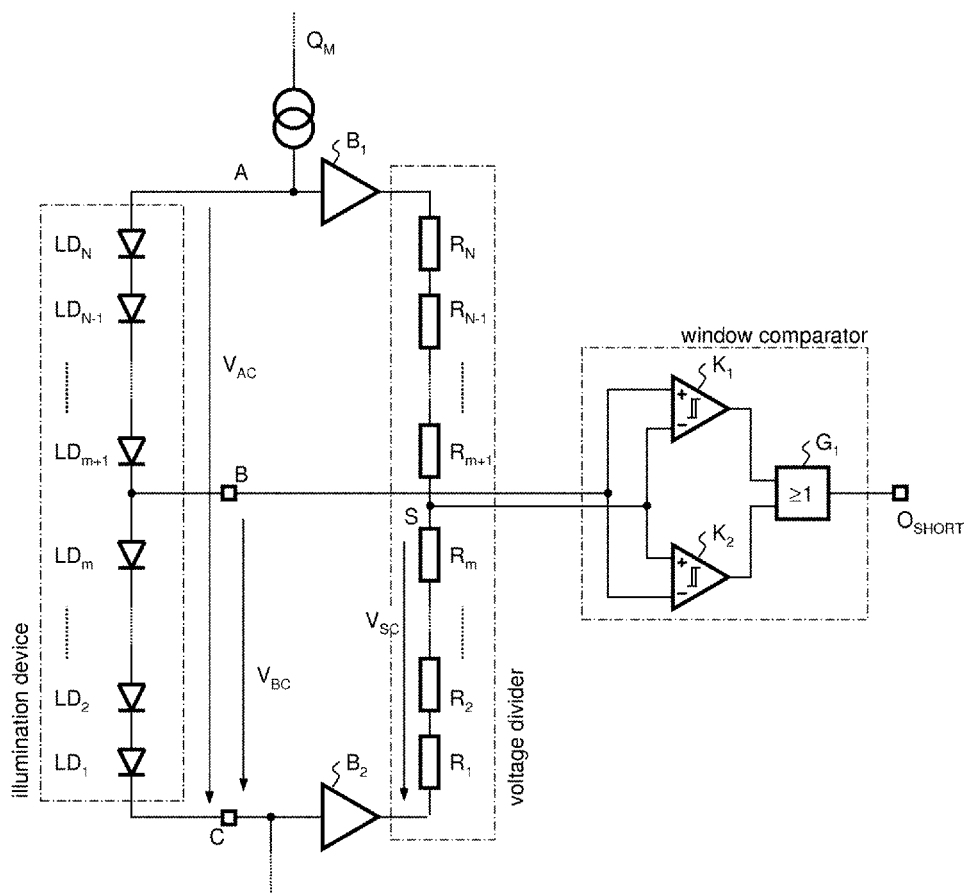
FIG. 4 illustrates one circuit configured to detect whether a LED chain includes a defective LED which failed as a short-circuit.

FIG. 4 illustrates one example of detecting defective LEDs which fail as short-circuit. A defective LED may become manifest in either an open circuit or a short circuit between the two terminals of the defective LED. The case of an open circuit defect will be discussed later. If one LED of a LED chain fails as a short circuit only the defective LED stops radiating light and the overall voltage drop across the LED chain decreases by the forward voltage of the respective LED. A short circuit defect may therefore be detected by monitoring the overall voltage drop across the LED chain. If this overall voltage drop falls below a constant threshold voltage a defective LED (which has failed as short circuit) is detected. A problem that is inherent with such a concept of short circuit fault detection is that the voltage drop across a LED chain does not only decrease due to a short circuit defect of one LED but may also vary due to variations of temperature as well as due to aging effects. As a result of this, it is possible that a fault is detected although all LEDs are good or a defective LED is not detected. This may be particularly the case in applications with wide temperature ranges, for example, in automotive applications where incandescent lamps are increasingly substituted by illumination devices based on LEDs.

To remedy the problems discussed above a circuit for detecting failures in an illumination device comprising at least two light emitting diodes connected in series (illumination device comprising a LED chain) has been proposed in the publication US 2010/0264828 A1. The proposed circuit will be outlined below. FIG. 4 illustrates a circuit that comprises a first circuit node A, a second circuit node C, and a third circuit node B for interfacing the illumination device such that the voltage drop $V_{AC}$ across the chain of light emitting diodes $LD_1, LD_2, \ldots, LD_N$ is applied between the circuit nodes A and C and a fraction $V_{BC}$ of the voltage drop $V_{AC}$ is applied between the circuit nodes B and C. That is, the chain of LEDs, $LD_1, LD_2, \ldots, LD_N$ has a middle tap connected to circuit node B. The ratio $k_{nominal}$ between the fractional voltage $V_{BC}$ and the voltage drop $V_{AC}$ across the LED chain is (approximately, as will be discussed later)

$$k_{nominal} = m/N,$$

whereby N is the total number of LEDs in the chain and m the number of LEDs between the middle tap of the LED chain and circuit node C. The ratio $k_{nominal}$ is therefore a predefined value dependent on the physical set-up of the LED chain.

The circuit of FIG. 4 further comprises an evaluation unit coupled to the circuit nodes A, B, and C. The evaluation unit is configured to assess whether the electric potential $V_B$ present at the third circuit node B is within a pre-defined range of tolerance about a nominal value $k_{nominal} \cdot V_{AC}$. As mentioned above, the nominal value $k_{nominal} \cdot V_{AC}$ is defined as a pre-defined fraction $k_{nominal} = m/N$ of the potential difference $V_{AC}$ between the circuit nodes A and C.

By using a pre-defined ratio $k_{nominal}$ of the voltage drop $V_{AC}$ across the LED chain as criterion instead of using a fixed voltage threshold as mentioned above for assessing whether the LED chain comprises defective LEDs the fault detection becomes more reliable and more robust against variations of the forward voltages of the single LEDs, whereby these variations may be, inter alia, due to changes in temperature or due to aging effects.

As illustrated in the example of FIG. 4 the evaluation unit may comprise a voltage divider coupled to the circuit nodes A and C and configured to provide at a middle tap S the above mentioned pre-defined fraction $V_{SC} = k_{nominal} \cdot V_{AC} = V_{AC} \cdot m/N$ of the potential difference $V_{AC}$ between circuit nodes A and C. That is, the voltage divider provides a fractional voltage $V_{SC}$ that is (approximately) equal to the fractional voltage $V_{BC}$ provided by the LED chain in the case of all LEDs of the chain are fully functional.

In case of a short circuit between the anode terminal and the cathode terminal of at least one LED of the LED chain the actual ratio $k = V_{BC}/V_{AC}$ will change to either:

$$k = m/(N-1), \text{ thus } k > k_{nominal}$$

in case the defective LED is located between the circuit nodes A and B or:

$$k = (m-1)/(N-1), \text{ thus } k < k_{nominal}$$

in case the defective LED is located between the circuit nodes B and C. When evaluating both of the above mentioned cases a localization of the defective LED may be implemented. This may be especially useful if the illumination device comprises two spatially separate LED sub-chains connected in series and the circuit node B connects to the illumination device in between these sub-chains. It is thus possible to locate a defective LED in either the first or the second LED sub-chain.

By checking whether the fractional voltage $V_{BC} = k \cdot V_{AC}$ is approximately equal to the voltage $V_{SC} = k_{nominal} \cdot V_{AC}$ the integrity of the LED chain can be tested. In practice "approximately equal" means that the voltage $V_{BC} = k \cdot V_{AC}$ is within a given range of tolerance $\Delta V$ about the voltage $V_{SC} = k_{nominal} \cdot V_{AC}$, for example:

$$V_{BC} \in [V_{SC} - \Delta V, V_{SC} + \Delta V],$$

which is tantamount to:

$$k \in [k_{nominal} - \Delta k, k_{nominal} + \Delta k].$$

if only the ratios are considered (note: $\Delta V = \Delta k \cdot V_{AC}$).

The above described comparison between the voltages $V_{BC}$ and $V_{SC}$ may be implemented by using a window comparator with a relatively "narrow" window compared to the absolute value of the fractional voltage $V_{BC}$ (or $V_{SC}$). In the example of FIG. 4 the window comparator is realized by using two comparators $K_1$ and $K_2$, each having a hysteresis $\Delta V$, and an OR-gate $G_1$ that combines the output signals of the comparators $K_1$ and $K_2$. The output of the OR gate $G_1$ indicates whether a defective LED is detected in the LED chain $LD_1$, $LD_2, \ldots, LD_N$ or whether the LED chain $LD_1, LD_2, \ldots, LD_N$ is fully functional. It should be noted that the voltage $V_{SC}$ may be provided to one input of the window comparator by any appropriate alternative instead using a tapped voltage divider as illustrated in the example of FIG. 4. For example, the voltage $V_{SC}$ may be provided by an appropriately programmed digital-to-analogue converter (ADC), actually the tapped voltage divider could be seen as a kind of ADC if the middle tap could be digitally chosen. Further, the nominal factor $k_{nominal}$ may be set to m/N but also measured (e.g., at the end of the production line) to also consider tolerances of the forward voltages of the individual LEDs.

Figure 5:
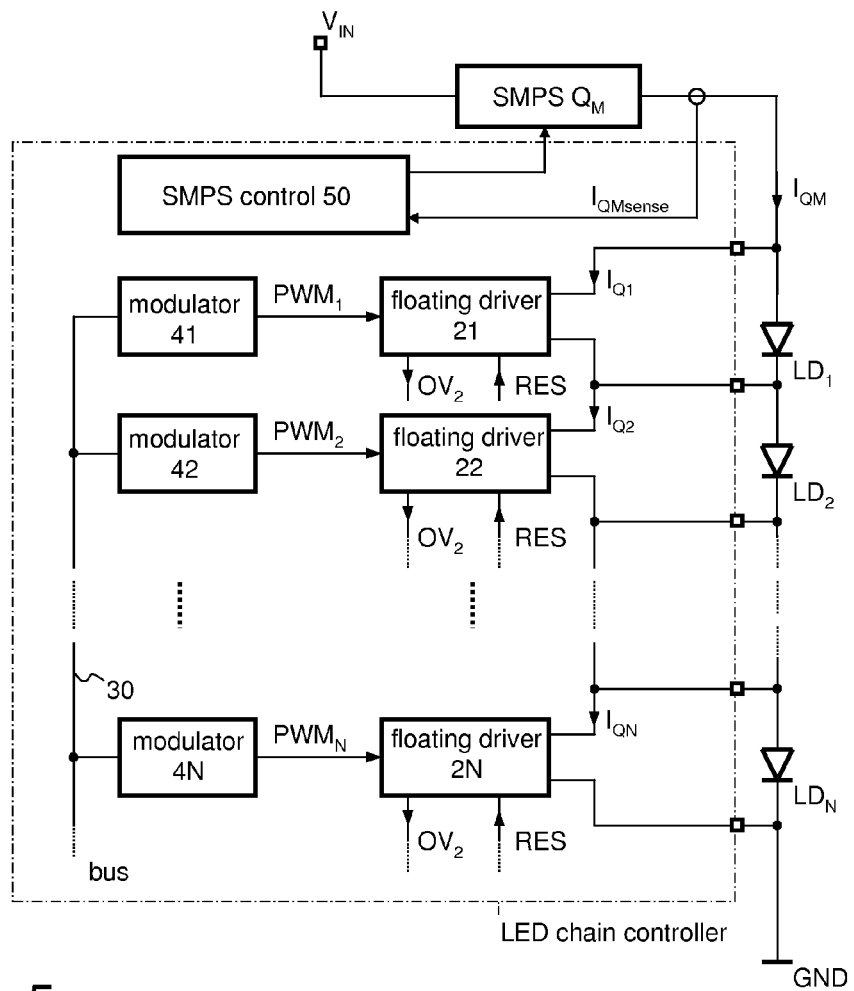
FIG. 5 illustrates the structure of one example of a novel LED chain controller wherein each LED is controlled by an individual floating driver.

FIG. 5 illustrates the structure of a LED chain controller in accordance with one example of the present invention. Although not further discussed below, the short-circuit detection as explained above with reference to FIG. 4 may be generally included in any LED chain controller described herein (see FIGS. 7 to 9). The respective circuitry is omitted in some illustrations to avoid distraction from the illustrated parts.

In accordance with the example of FIG. 5 a LED chain of N individual LEDs, $LD_i$ (i=1, 2, ..., N) is coupled in series so as to be supplied with the same load current which is provided by an (AC/DC or DC/DC) switching converter $Q_M$ also referred to as "switched mode power supply" or shortly SMPS. The LED chain includes terminals forming intermediate taps, one intermediate tap coupled to each circuit node connecting two neighboring LEDs. The LED chain further includes two supply terminals coupled to an output node of the SMPS $Q_M$ and a reference potential (e.g., ground GND), respectively. The LED chain controller includes a switching converter controller 50 which receives a measured representation $i_{SENSE}$ of the output current of the SMPS $Q_M$ (being the load current $i_{QM}$ supplied to the LED chain) and provides appropriate switching signals controlling the power switches of the SMPS $Q_M$ so as to implement a regulated constant current output. Various possibilities of providing a measured representation of the output current $I_{QM}$ are known in the art and thus not further discussed herein. The simplest option would be employing a current sense resistor.

In the following each individual LED is regarded as a one-port network, the two terminals of the port being the anode and the cathode of the respective LED. The floating LED drivers $2i$ (i=1, 2, ..., N) discussed below can also be regarded as an (adaptive) one-port network (including some extras). The LED chain controller includes a plurality of floating LED drivers $2i$ each having one port being coupled to a respective LED $LD_i$ (i=1, 2, ..., N) of the LED chain via the supply terminals and the intermediate taps of the LED chain. Each floating driver $2i$ is configured to take over, fully or partially, the load current $i_{QM}$ provided to all LEDs by the SMPS $Q_M$. The current taken over by a floating driver $2i$ can be seen as bypass current and is denoted as $i_{Qi}$ (i=1, 2, ..., N). The remaining current (net LED current) is the current actually flowing through the respective LED $LD_i$ and contributing to the light emitted by that individual LED.

The bypass current $i_{Qi}$ (and thus the net LED current $i_{QM}$-$i_{Qi}$) may be modulated in accordance with a modulated control signal $PWM_i$ (i=1, 2, ..., N) provided by a respective modulator $4i$ (i=1, 2, ..., N). For example, pulse width modulation may be used. However, other types of modulation (e.g. pulse density modulation) may be applicable. The modulators $4i$ set the duty cycle (or the on-time) of the modulated control signals $PWM_i$ in accordance with respective input signals which may be received, for example, over a bus line 30.

Although a significant voltage drop may occur across the LED chain as a whole, the voltage drop across one individual LED (i.e., the forward voltage) is comparably small and usually below 4 volts. As the drivers $2i$ are floating with respect to ground the bypass transistors $Q_i$ coupled in parallel to the LEDs $LD_i$ (i=1, 2, ..., N) are not required to withstand voltages significantly higher than the forward voltage of the respective LED. Thus, the bypass transistors $Q_i$ can be efficiently implemented and integrated using low voltage components having a breakdown voltage of 10 volts or even less. Such low voltage components (e.g., MOSFETs with a nominal reverse voltage of 5 V and a breakdown voltage of 10 V) may require an over-voltage protection to avoid over-voltage breakdown when a LED becomes defective and fails as an open circuit. The details of the floating drivers $2i$ are discussed below with reference to FIG. 6.

Figure 6:
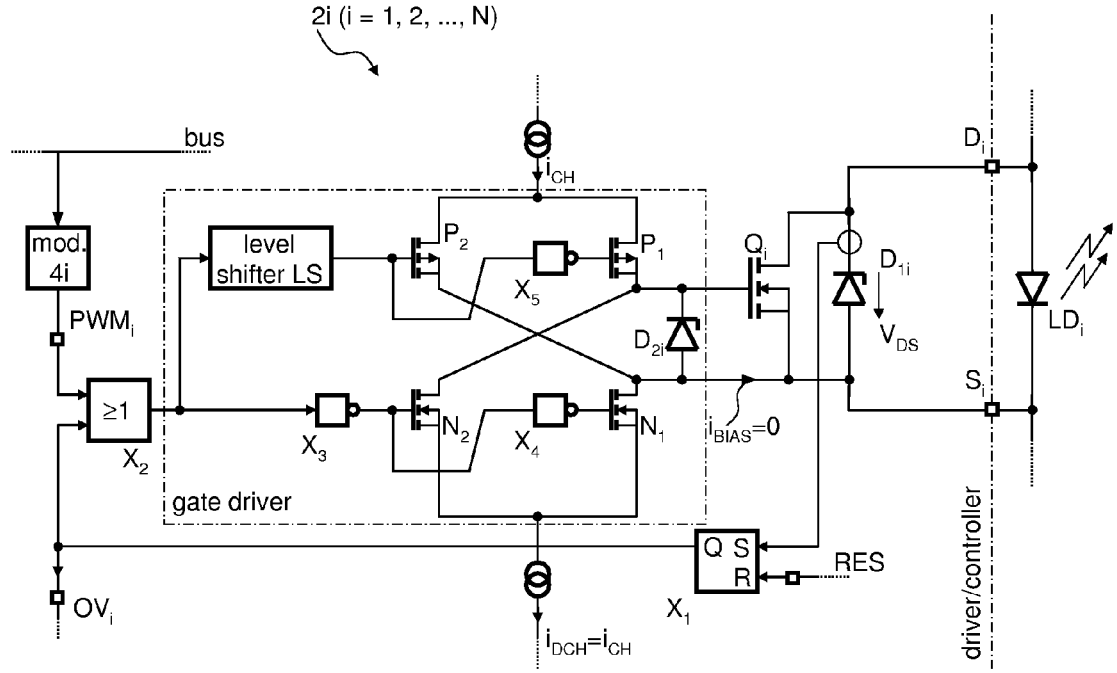
FIG. 6 illustrates one exemplary implementation of a floating driver as used in the example of FIG. 5 in more detail.

FIG. 6 illustrates one exemplary LED $LD_i$ of the LED chain of FIG. 5, the corresponding floating driver $2i$, as well as the corresponding modulator $4i$ receiving commands from the bus 30. The same structure of the floating driver $2i$ may be used for each LED of the LED chain. The (output) port of the floating driver is formed by the load terminals of a transistor load current path. In the present example these are the drain and the source terminal of a MOS transistor $Q_i$ (i=1, 2, ..., N). When activated the MOS transistor's load path (drain-source current-path) carries the bypass current $i_{Qi}$ mentioned above. Consequently, the transistor $Q_i$ is also referred to as "bypass transistor". The transistor is sequentially switched on and off in accordance with the modulator output signal $PWM_i$. Thus the bypass current $i_{Qi}$ (and as a result also the net LED current) is modulated between $i_{Qi}=0$ and $i_{Qi}=i_{QM}$ such that its average value equals a desired value corresponding to a desired LED brightness. In other words, if the bypass transistor $Q_i$ is switched on, the corresponding LED $LD_i$ is switched off and the load current $i_{Qi}=i_{QM}$ is bypassed via the transistor $Q_i$. The duty cycle of the modulator output signal $PWM_i$ determines the visible brightness of the LED.

As mentioned above, the floating drivers $2i$ may be implemented using low voltage semiconductor components. For this reason, an innovative over-voltage protection mechanism is provided in the floating driver $2i$ as outlined below. An over-voltage detection circuit including a diode $D_{1i}$, particularly a Zener diode, is coupled in parallel to each individual LED and thus coupled to the (output) port of the floating driver $2i$ as well as in parallel to the main current-path of the bypass transistor $Q_i$. The respective zener voltage is lower than the break-down voltage of the corresponding bypass transistor $Q_i$ and higher than the forward voltage of the corresponding LED $LD_i$ and thus carries no current during normal operation.

As the SMPS $Q_M$ operates as current source, the voltage across a LED starts rising to a level that is significantly higher than the normal forward voltage when a LED $LD_i$ becomes defective by forming an open circuit. Any high ohmic current path provided by the defective LED can be seen as open circuit in this context when resulting in the excess voltage mentioned above. However, the voltage across the (defective) LED $LD_i$ is practically limited to the zener voltage (e.g., 5 volts) of the zener diode $D_{1i}$ coupled to the respective LED, as the zener diode takes over the load current (while the bypass transistor $Q_i$ is off) thereby protecting the bypass transistor $Q_i$ and other circuitry against the excess voltage occurring as a result of the defective LED. In other words a detectable current (higher than a negligible reverse current) through the diode $D_{1i}$ is unambiguously indicative of an over-voltage at the output port of the floating driver. Such a zener diode current may be detected and, upon positive detection, an over-voltage failure signal $OV_i$ may be set, for example, using a flip flop $X_1$. The over-voltage failure signal $OV_i$ may be combined (e.g., using an OR-gate $X_2$) with the corresponding modulator output signal $PWM_i$ to permanently switch on the bypass transistor $Q_i$ which then provides a current bypass around the broken LED. As a result, an excessive power dissipation in the Zener diode (zener voltage times load current), which may cause permanent damage to the circuit, is avoided. Further, only the defective LED remains dark while the other LEDs may normally operate. Without the over-current protection combined with the bypass transistor the whole LED chain would be become inoperative and the bypass transistors $Q_i$ would be permanently damaged.

The sensing of the zener diode current is not illustrated in detail in FIG. 6 as various suitable current sense circuits are known in the art. A simple implementation could employ a current sense resistor coupled in series to the zener diode $D_{1i}$. However, other options are applicable. For example, a current mirror may be coupled in series to the zener diode to minor the zener diode current in case of an over-voltage. The mirror current may be further processed to detect an over voltage and to signal the over-voltage by providing an appropriate logic signal. Upon detection of a significant zener diode current, the RS-flip-flop $X_1$ set and the flip-flop's output signal $OV_i$ is OR-combined with the modulated signal $PWM_i$ so as to switch on the bypass transistor $Q_i$ permanently which provides a low ohmic bypass current path around the broken LED. The bypass is only deactivated by an external reset signal which may be provided to the RS-flip-flop $X_1$. Additionally, the flip-flop's output signal $OV_i$ may be provided to other circuitry for further processing.

In the examples described herein a zener diode is employed as an over-voltage detection circuit. However, other circuitry may also be suitable for detecting an over-voltage. For example, the zener diode and the zener diode current sensing circuitry may be replaced by a resistive or capacitive voltage divider, whose middle tap is coupled to a comparator which is triggered as soon as the voltage across the voltage divider exceeds a defined threshold (e.g., 5 volts). The output of the comparator could be latched using the flip-flop $X_1$. Further alternatives may be readily implemented by a skilled person.

As mentioned above, the bypass transistors $Q_i$ are switched on and off in accordance with the corresponding modulator output signals $PWM_i$. A floating gate driver circuit including the transistors $P_1$, $P_2$, $N_1$, $N_2$, a level shifter LS, and the inverters $X_3$, $X_4$, and $X_5$, is used to implement the task of charging and discharging the gate of a bypass transistor $Q_i$. The specific implementation of the gate driver circuit illustrated in FIG. 6 is designed such that no bias current $i_{BIAS}$ is injected into (or drawn from) the LED chain by the floating driver 21.

The gate driver is supplied with a constant current $i_{CH}=i_{DCH}$ which can be directed to charge or discharge the gate of the bypass transistor $Q_i$ by the semiconductor switches $N_1$, $P_1$, $N_2$, and $P_2$. In the present example the switches $N_1$ and $N_2$ are implemented as normally-off NMOS transistors whereas the switches $P_1$ and $P_2$ are implemented as normally-off PMOS transistors. These transistors are coupled to the bypass transistor $Q_i$ in such a manner that the main current paths (i.e., drain-source current paths) of the transistors $N_1$, $P_1$, $N_2$, and $P_2$ are connected in series to the gate-source capacitor of the bypass transistor $Q_i$. For charging the gate with a constant current $i_{CH}$ the transistors $P_1$ and $N_1$ are activated (switched on) so as to direct the current $i_{CH}$ from the high side via the PMOS transistor $P_1$ through the gate-source capacitor of the bypass transistor $Q_i$ and, if the gate voltage is high enough, through the Zener diode $D_{2i}$ coupled in parallel to the gate-source capacitance. At the source terminal the gate charging current is sunk via NMOS transistor $N_1$. Analogously, for discharging the gate with a constant current $i_{DCH}=i_{CH}$ the transistors $N_2$ and $P_2$ are activated so as to direct the current $i_{DCH}$ via from the high side via the PMOS transistor $P_2$ through the gate-source capacitor of the bypass transistor $Q_i$ and through the Zener diode $D_2$, coupled in parallel to the gate-source capacitance. At the source terminal the gate charging current is sunk via NMOS transistor $N_1$. However, for discharging the gate-source capacitance is connected "reversely" between the transistors $P_2$ and $N_2$ to allow discharging rather than charging the gate.

For activating and deactivating the PMOS transistors $P_1$ and $P_2$ a level shifter LS is required to "drag" the modulated signal's $PWM_i$ signal level up to the PMOS transistors source potential. In the present implementation, the NMOS transistors $N_1$, $N_2$ are activated by when the modulated signal $PWM_i$ (OR combined with $OV_i$) is at a high level ($PWM_i=1$), whereas the PMOS transistors $P_1$, $P_2$ are activated by when the modulated signal $PWM_i$ (OR combined with $OV_i$) is at a low level ($PWM_i=0$). As a result only transistors $P_1$ and $N_1$ as active when $PWM_i=1$ to charge the gate of the bypass transistor $Q_i$, and only transistors $P_2$ and $N_2$ are active when $PWM_i=0$ to discharge the gate of the bypass transistor $Q_i$. The inverters $X_3$, $X_4$, and $X_5$ are used to enable the alternating activation of transistors $P_1$ and $N_1$, and transistors $P_2$ and $N_2$.

A further zener diode $D_{2i}$ may be coupled in parallel to the gate source capacitor of each bypass transistor $Q_i$ to protect the gate from over-voltage. When, due to the charging of the gate capacitor, the gate voltage rises up to the zener voltage of the zener diode $D_{2i}$ then the diode takes over the charge current $i_{CH}$ and the gate voltage is limited (clamped) to the zener voltage.

Using the gate driver circuit as illustrated in FIG. 6 ensures that the bias current $i_{BIAS}$ injected from the floating driver $2i$ into the LED chain load current path is zero. In conventional gate driver circuits the gate charging current would add to the source current of the respective bypass transistors and thus contribute to the load current of the LED chain in an undesired manner.

Figure 7:
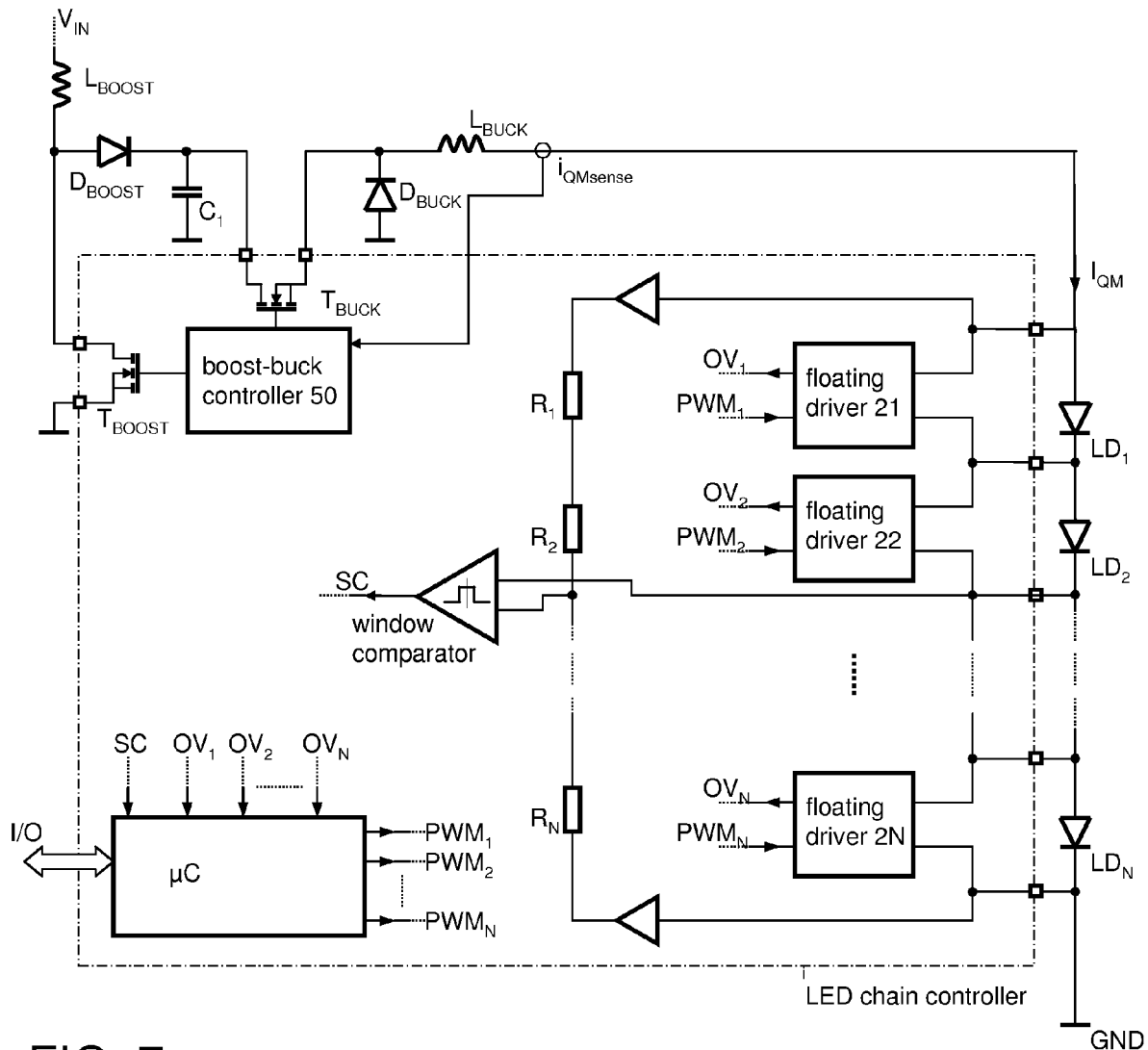
FIG. 7 illustrates a boost-buck converter (split-pi topology) without output capacitor supplying a LED chain, the boost-buck converter operation and the LED chains being controlled by a LED chain controller as illustrated in FIGS. 5 and 6.
Figure 8:
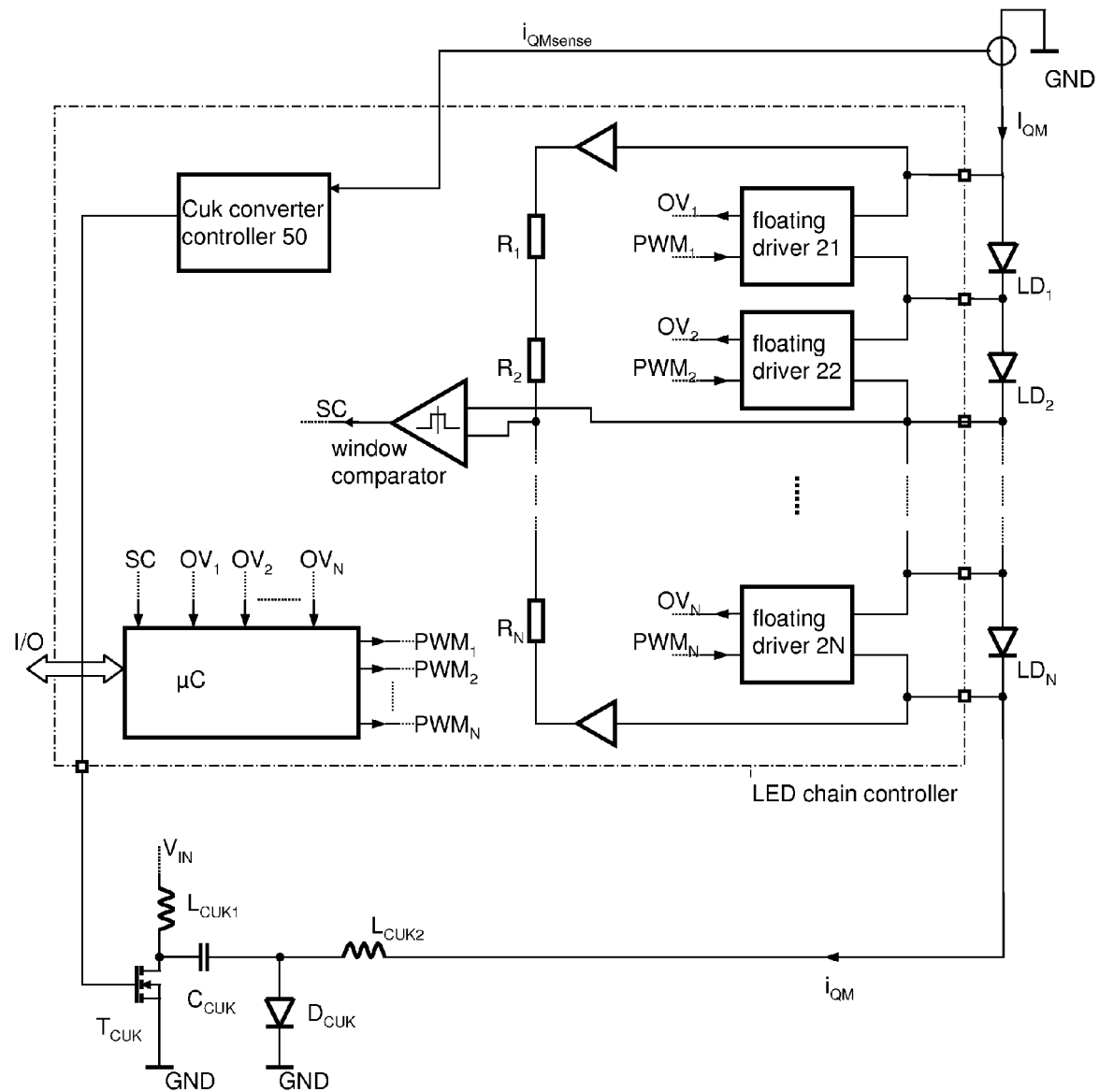
FIG. 8 illustrates a Ćuk converter without output capacitor supplying a LED chain, the Ćuk converter operation and the LED chains being controlled by a LED chain controller as illustrated in FIGS. 5 and 6.
Figure 9:
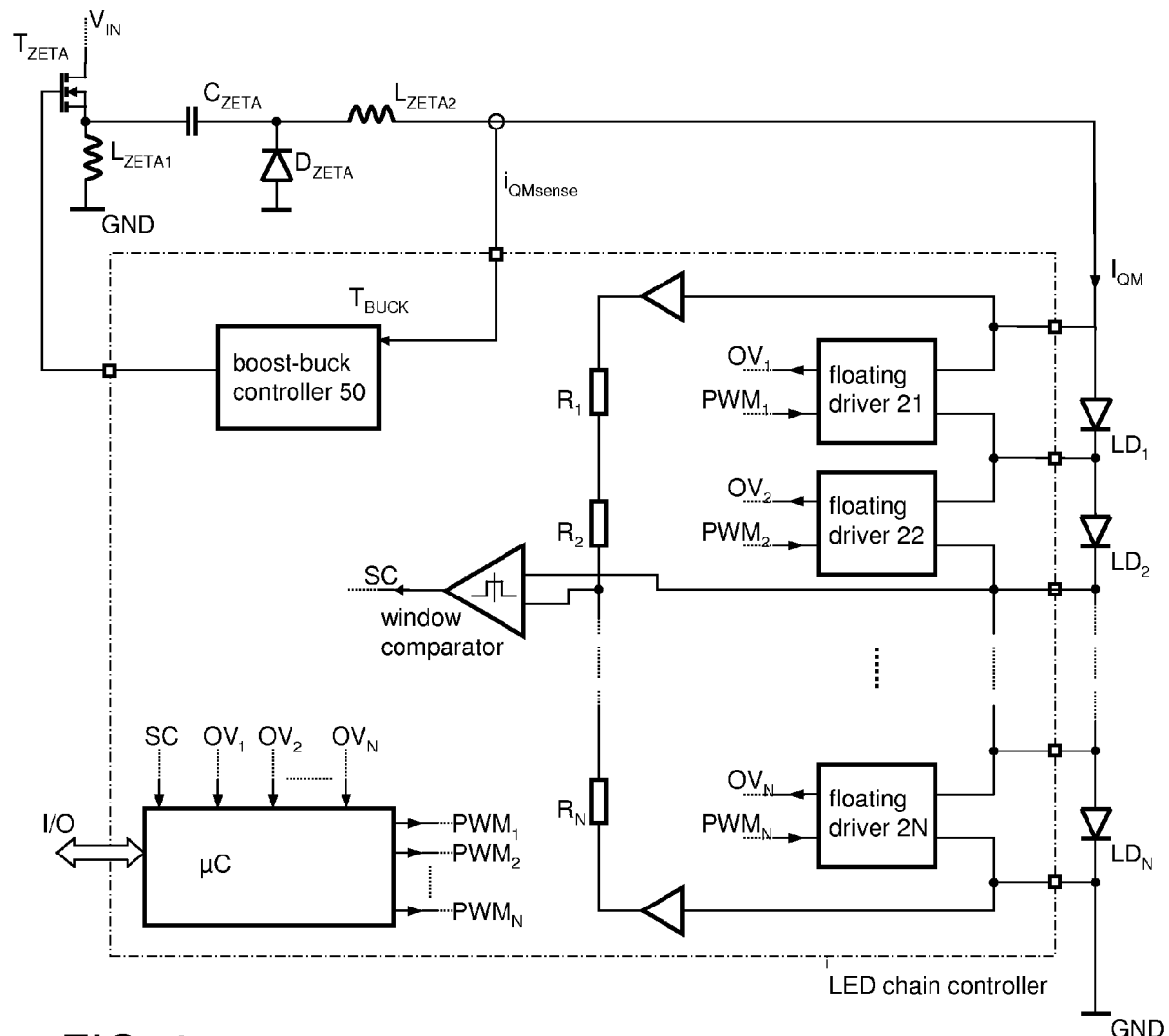
FIG. 9 illustrates a Zeta converter without output capacitor supplying a LED chain, the Zeta converter operation and the LED chains being controlled by a LED chain controller as illustrated in FIGS. 5 and 6.

FIGS. 7 to 9 illustrates the application of the floating drivers $2i$ as shown in FIG. 6 in a LED chain controller as shown in FIG. 5 in connection with different types of switching converters $Q_M$. One might be tempted to believe that the type of switching converter actually used in connection with the floating drivers $2i$ (see FIGS. 5 and 6) would be irrelevant. Nevertheless, it actually is not for the reasons outlined below.

Due to the switched bypassing of individual LEDs the total voltage drop across the LED chain may vary by several volts dependent on the switching states of the bypass transistors. In some specific switching converter topologies this would lead to a capacitive current in the switching converter's output capacitor. Assuming a capacitance of 10 µF and a voltage step of 4 V during a transitional time of 1 µs, the capacitive current would be 40 amperes. Such high currents may easily degrade or destroy the capacitor as well as the LEDs of the LED chains. As a result switching converters should be used which have (1) no output capacitor (or only a very small capacitance and thus negligible) and (2) an inductor coupled in series to the LED chain, such that the same current flows through the inductor and the LED chain. The output capacitor is regarded to be negligible when the capacitive currents due to the switching of the bypass transistors are negligible as compared to the load current $i_{QM}$. That is, the maximum capacitance should not exceed a critical value which would lead to nocuous excess peak currents. For example, if the maximum peak allowable current is 20% of a nominal LED load current of 1 A (and assuming the same voltage step of 4 V during a transitional time of 1 µs as in the example above) the switching converter output capacitance should not exceed 0.2 A·1 µs/4V=50 nF. In the present example, an output capacitance of lower than 50 nF can be regarded as negligible. Among the commonly known and used switching converter only buck-converters, boost-buck (split-pi) converters, Ćuk converters, and zeta converters comply with the requirements mentioned above. Boost converters, buck-boost converters, SEPIC converters and charge pumps do not comply with these requirements. However, the converter topologies mentioned above is not regarded as complete list.

Figure 3:
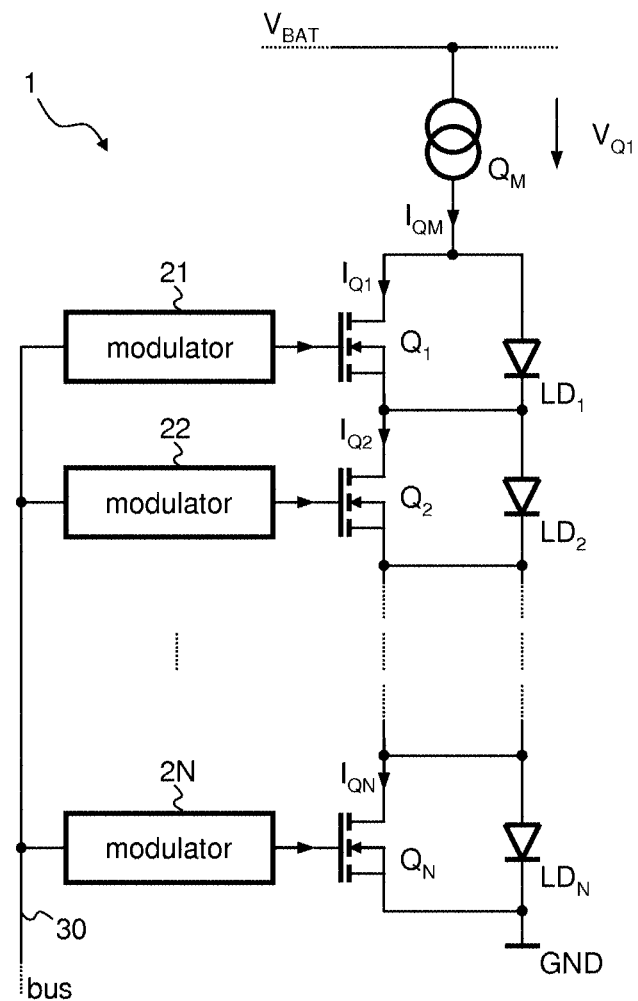
FIG. 3 illustrates one exemplary implementation of the basic circuit of FIG. 2.

FIG. 7 illustrates the application of a LED chain controller in connection with a split-pi converter. The LED chain controller combines the basic structure of FIG. 3, the features of the floating drivers $2i$ illustrated in FIG. 6 (over voltage protection, no bias current), and the short-circuit protection illustrated in FIG. 4. As mentioned above, the split-pi converter does not require an output capacitor and an inductor (here inductor $L_{BUCK}$) is coupled in series to the LED chain. The LED chain controller includes a switching converter controller (boost-buck controller 50) which receives a measured representative $i_{QMsense}$ of the load current supplied to the LED chain and provides gate signals to the switching converter's power switches $T_{BOOST}$ and $T_{BUCK}$, thereby implementing a constant current regulation of the load current $i_{QM}$. As the split-pi converter per se is known, the switching converter details are not further discussed herein.

The modulators $4i$ are not explicitly depicted in FIG. 7 as these may be regarded as being included in the micro controller µC using appropriate software. However, a separate implementation of the modulators $4i$ using dedicated hardware may be applicable. The micro controller is configured to provide the modulated signals $PWM_i$ for the LEDs $LD_i$ of the LED chain, and to set the duty cycle of these modulated signals $PWM_i$ to set the respective LEDs to a desired brightness provided by data received via the I/O interface from external components. The micro controller µC is also configured to receive the short-circuited LED failure signal SC and the open LED failure signals $OV_i$ and to forward corresponding error messages via the I/O interface to external components.

FIG. 8 corresponds essentially to the example of FIG. 7. In contrast to the example of FIG. 7 a Ćuk converter is used instead of a split-pi converter. As the Ćuk converter sinks current it is coupled to the low side of the LED chain whereas the high side is connected to ground. As in the previous example, the switching converter has an inductor $L_{CUK2}$ connected in series with the LED chain and no output capacitor coupled parallel to the LED chain. As the Ćuk converters per se are known, the switching converter details are not further discussed herein.

FIG. 9 also corresponds essentially to the example of FIG. 7. In contrast to the example of FIG. 7 a Zeta converter is used instead of a split-pi converter. As in the previous examples, the switching converter has an inductor $L_{ZETA2}$ connected in series with the LED chain and no output capacitor coupled parallel to the LED chain. As the Zeta converters per se are known, the switching converter details are not further discussed herein.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Each individual feature described herein has been described in isolation. It is understood, however, that any combination of two or more such features, to the extent that such features or combinations are capable of being carried out based on the present specification as a whole in the light of the common general knowledge of a person skilled in the art, are also disclosed. This disclosure is irrespective of whether such features or combinations of features solve any problems explicitly disclosed herein, and without limitation to the scope of the claims. Aspects of the present invention may consist of any such individual feature or combination of features. In view of the foregoing description it will be evident to a person skilled in the art that various modifications may be made within the scope of the invention.

What is claimed is:

1. A circuit for controlling a plurality of LEDs coupled in series, the circuit comprising:
   a switching converter operable as a current source to be coupled to the plurality of LEDs to provide a constant load current thereto, the switching converter including an inductor to be coupled in series with the plurality of LEDs such that when the LEDs are coupled, the same load current flows through the inductor and the plurality of LEDs;
   a plurality of floating driver circuits, each floating driver circuit to be coupled in parallel to a respective individual LED of the plurality of LEDs, each floating driver circuit configured to fully or partially take over the load current thereby bypassing the respective LED in accordance with a respective modulated input signal to control the intensity of light emitted by the respective LED; and
   a modulator for each floating driver circuit, the modulator providing the modulated input signal supplied to the respective floating driver circuit, a duty cycle of the modulated input signal being dependent on input data received via an I/O interface.

2. The circuit of claim 1, wherein the switching converter comprises a converter selected from the group consisting of a split-pi converter, a Ćuk converter, and a Zeta converter, the converter either without employing an output capacitor or providing merely a negligible output capacitance.

3. The circuit of claim 1, further comprising the plurality of LEDs coupled to the switching converter and to the floating driver circuits.

4. The circuit of claim 1, wherein the output capacitance of the switching converter is negligible as having such a small value that the capacitive currents through the load do not exceed a maximum capacitive current.

5. The circuit of claim 1, wherein no substantial capacitance is coupled between the inductor and the plurality of LEDs.

6. The circuit of claim 1, wherein no substantial capacitance is coupled in parallel with the plurality of LEDs.

7. A circuit for controlling a plurality of LEDs coupled in series, the circuit comprising:
   a switching converter operable as a current source to be coupled to the plurality of LEDs to provide a constant load current thereto, the switching converter including an inductor to be coupled in series with the plurality of LEDs such that when the LEDs are coupled, the same load current flows through the inductor and the plurality of LEDs; and
   a plurality of floating driver circuits, each floating driver circuit to be coupled in parallel to a respective individual LED of the plurality of LEDs, each floating driver circuit configured to fully or partially take over the load current thereby bypassing the respective LED in accordance with a respective modulated input signal to control the intensity of light emitted by the respective LED, wherein each floating driver circuit comprises
      a bypass transistor having a load current path to be coupled in parallel with the corresponding LED, and
      an over voltage detection circuit to be coupled in parallel with the respective LED and configured to signal an over-voltage when a voltage across the load current path of the bypass transistor reaches a maximum voltage.

8. The circuit of claim 7, wherein the over voltage detection circuit comprises:
   a zener diode having a zener voltage that determines the maximum voltage; and
   a current sense circuit coupled to the zener diode to detect a reverse diode current, the sense circuit providing a sense signal indicative of whether a diode current is present.

9. The circuit of claim 7, wherein the over voltage detection circuit comprises a voltage divider, a middle tap of the voltage divider providing a sense signal indicative of whether the voltage across the load current path of the bypass transistor.

10. The circuit of claim 7, wherein the over voltage detection circuit comprises:
    a resistor;
    a current mirror having a main current path and a minor current path, the main current path coupled in series with the resistor; and a current sense circuit coupled to minor the current path to detect whether the minor current exceeds a threshold corresponding to the maximum voltage.

11. The circuit of claim 7, wherein each floating driver circuit further comprises:
a latch configured to activate a respective over-voltage signal in response to the over voltage detection circuit signaling an over-voltage.

12. The circuit of claim 11, wherein each floating driver circuit further comprises:
a gate driver configured to drive the bypass transistor into an ON state and an OFF state in accordance with the modulated input signal; and
a logic gate receiving the modulated input signal and the over-voltage signal and configured to override the modulated input signal in case the over-voltage signal is active so as to switch on the bypass transistor.

13. The circuit of claim 12, wherein the gate driver is supplied by a supply line providing a constant current and is configured to sink this current, direct it through a gate-source capacitance of the bypass transistor to charge or discharge the gate, and to supply this current back to the supply line, such that no substantial bias current is injected into or drawn from the load current path of the plurality of LEDs.

14. A circuit for controlling a plurality of LEDs coupled in series, the circuit comprising:
a switching converter operable as a current source to be coupled to the plurality of LEDs to provide a constant load current thereto, the switching converter including an inductor to be coupled in series with the plurality of LEDs such that when the LEDs are coupled, the same load current flows through the inductor and the plurality of LEDs;
a plurality of floating driver circuits, each floating driver circuit to be coupled in parallel to a respective individual LED of the plurality of LEDs, each floating driver circuit configured to fully or partially take over the load current thereby bypassing the respective LED in accordance with a respective modulated input signal to control the intensity of light emitted by the respective LED; and
a short-circuit-detection circuit comprising a window comparator receiving, as a first input, a defined fraction of the voltage drop across the plurality of LEDs and, as a second input, the voltage tapped at an intermediate tap of the plurality of LEDs, the window comparator configured to provide a failure signal if the difference between the signal level of the two inputs exceeds a predefined threshold.

15. A circuit for controlling a plurality of LEDs coupled in series, the circuit comprising:
a current source to be coupled to the plurality of LEDs to provide a constant load current thereto; and
a plurality of floating driver circuits, each floating driver circuit to be coupled in parallel to a respective individual LED of the plurality of LEDs, each floating driver circuit configured to fully or partially take over the load current thereby bypassing the respective LED in accordance with a respective modulated input signal to control the intensity of light emitted by the LED, wherein each floating driver circuit comprises:
a bypass transistor having a load current path to be coupled in parallel to the corresponding LED; and
an over voltage detection circuit to be coupled in parallel to the corresponding LED and configured to signal an over-voltage when a voltage across the load current path of the bypass transistor reaches a maximum voltage.

16. The circuit of claim 15, wherein each floating driver circuit further comprises:
a latch configured to activate a respective over-voltage signal in response to the over voltage detection circuit signaling an over-voltage.

17. The circuit of claim 16, wherein each floating driver circuit further comprises:
a gate driver configured to drive the bypass transistor into an ON state and an OFF state in accordance with the modulated input signal; and
a logic gate receiving the modulated input signal and the over-voltage signal and configured to override the modulated input signal in case the over-voltage signal is active so as to permanently switch on the bypass transistor.

18. The circuit of claim 15, further comprising a short-circuit-detection circuit comprising:
a window comparator receiving, as a first input, a defined fraction of the voltage drop across the plurality of LEDs and, as a second input, the voltage tapped at an intermediate tap of the plurality of LEDs, the window comparator configured to provide a failure signal if the difference between the signal level of the two inputs exceeds a predefined threshold.

19. A circuit for controlling a plurality of LEDs coupled in series, the circuit comprising:
a current source to be coupled to the plurality of LEDs to provide a constant load current thereto; and
a plurality of floating driver circuits, each floating driver circuit to be coupled in parallel to a respective individual LED of the plurality of LEDs, each floating driver circuit configured to fully or partially take over the load current thereby bypassing the respective LED in accordance with a respective modulated input signal to control the intensity of light emitted by the LED, wherein each floating driver circuit comprises
a bypass transistor having a load current path to be coupled in parallel to the corresponding LED,
a gate driver configured to drive the bypass transistor into an ON state and an OFF state in accordance with the modulated input signal, and
a logic gate receiving the modulated input signal and an over-voltage signal indicative of whether a voltage across the load current path of the bypass transistor has at least once reached a maximum voltage or not, the logic gate configured to override the modulated input signal in case the over-voltage signal is active so as to permanently switch on the bypass transistor.

20. The circuit of claim 19, wherein the gate driver is supplied by a supply line providing a constant current and is configured to sink this current, direct it through a gate-source capacitance of the bypass transistor to charge or discharge the gate, and to supply this current back to the supply line, such that no substantial bias current is injected into the load current path of the plurality of LEDs.

21. The circuit of claim 19, further comprising a short-circuit-detection circuit comprising:
a window comparator receiving, as a first input, a defined fraction of the voltage drop across the plurality of LEDs and, as a second input, the voltage tapped at an intermediate tap of the plurality of LEDs, the window comparator configured to provide a failure signal if the difference between the signal level of the two inputs exceeds a predefined threshold.

22. A circuit for controlling a plurality of LEDs coupled in series, the circuit comprising:

a current source to be coupled to the plurality of LEDs to provide a constant load current thereto; and a plurality of floating driver circuits, each floating driver circuit to be coupled in parallel to a respective individual LED of the plurality of LEDs, each floating driver circuit configured to fully or partially take over the load current thereby bypassing the respective LED in accordance with a respective modulated input signal to control the intensity of light emitted by the respective LED, wherein each floating driver circuit comprises a bypass transistor having a load current path being coupled in parallel to the corresponding LED, and a gate driver configured to drive the bypass transistor into an ON state and an OFF state in accordance with the modulated input signal, the gate driver being supplied by a supply line providing a constant current and is configured to sink this current, direct the constant current through a gate-source capacitance of the bypass transistor to charge or discharge the gate, and to supply this current back to the supply line, such that no substantial bias current is injected into the load current path of the plurality of LEDs.

23. The circuit of claim 22, further comprising a short-circuit-detection circuit comprising:

a window comparator receiving, as a first input, a defined fraction of the voltage drop across the plurality of LEDs and, as a second input, the voltage tapped at an intermediate tap of the plurality of LEDs, the window comparator configured to provide a failure signal if the difference between the signal level of the two inputs exceeds a predefined threshold.

24. The circuit of claim 22, wherein the fraction of the voltage drop across the plurality of LEDs is preset such that it approximately matches the tapped voltage of a LED chain including no defective LED.

* * * * *